(12) United States Patent
Winkler et al.

(10) Patent No.: US 7,464,960 B2
(45) Date of Patent: Dec. 16, 2008

(54) VEHICLE OCCUPANT WEIGHT CLASSIFICATION SYSTEM

(75) Inventors: Gerd Winkler, Regensburg (DE); Andreas Knueppel, Troy, MI (US); Gerald Schicker, Maxhuette (DE)

(73) Assignee: Continental Automotive Systems US, Inc., Auburn Hills ( * ) Notice: Subject to any disclaimer, the term of this patent is extended or adjusted under 35 U.S.C. 154(b) by 566 days.

(21) Appl. No.: 10/881,371

(22) Filed: Jun. 30, 2004

(65) Prior Publication Data

US 2004/0232674 A1 Nov. 25, 2004

Related U.S. Application Data

(60) Division of application No. 10/321,997, filed on Dec. 17, 2002, now Pat. No. 6,823,959, which is a continuation of application No. 09/900,282, filed on Jul. 6, 2001, now Pat. No. 6,578,870.

(60) Provisional application No. 60/217,579, filed on Jul. 12, 2000, provisional application No. 60/217,580, filed on Jul. 12, 2000, provisional application No. 60/217,582, filed on Jul. 12, 2000.

(51) Int. Cl.
*B60R 21/16* (2006.01)
(52) U.S. Cl. .................. 280/735; 180/273; 701/45; 74/29; 74/422; 340/436; 340/438; 340/667
(58) Field of Classification Search .......... 280/735; 180/273; 701/45; 340/436, 438, 667
See application file for complete search history.

(56) References Cited

U.S. PATENT DOCUMENTS

| | | | |
|---|---|---|---|
| 5,232,243 A | 8/1993 | Blackburn et al. | |
| 5,413,378 A | 5/1995 | Steffens, Jr. et al. | |
| 5,454,591 A | 10/1995 | Mazur et al. | |
| 5,474,327 A | 12/1995 | Schousek | |
| 5,570,903 A | 11/1996 | Meister et al. | |
| 5,605,348 A | 2/1997 | Blackburn et al. | |
| 5,618,056 A | 4/1997 | Schoos et al. | |
| 5,624,132 A | 4/1997 | Blackburn et al. | |
| 5,626,359 A | 5/1997 | Steffens, Jr. et al. | |
| 5,670,853 A | 9/1997 | Bauer | |

(Continued)

FOREIGN PATENT DOCUMENTS

DE 197 22163 12/1997

(Continued)

*Primary Examiner*—Joanne Silbermann
*Assistant Examiner*—Michael R Stabley

(57) ABSTRACT

A vehicle occupant classification system categorizes vehicle occupants into various classes such as adult, child, infant, etc. to provide variable control for a vehicle restraint system such as an airbag. The classification system utilizes sensors that are installed in various locations in the vehicle. The sensors are used to generate a three-dimensional profile for the vehicle occupant. Various factors can affect the accuracy of this three-dimensional profile. Fuzzy logic is used to reduce some of the inaccuracies by providing multiple decision levels for various stages of the classification. Inaccuracies are also caused by sensors shifting within the system from their original position. This condition creates offset and the system evaluates this offset and generates a correction factor to provide a more accurate three-dimensional profile. Electrically erasable programmable read-only memory is used to reduce complications and inaccuracies associated with seat occupant weight sensors that have mounting configurations that vary depending upon the vehicle.

20 Claims, 2 Drawing Sheets

U.S. PATENT DOCUMENTS

| | | |
|---|---|---|
| 5,678,854 A | 10/1997 | Meister et al. |
| 5,732,375 A | 3/1998 | Cashler |
| 5,821,633 A | 10/1998 | Burke et al. |
| 5,906,393 A | 5/1999 | Mazur et al. |
| 6,005,958 A * | 12/1999 | Farmer et al. ............... 382/103 |
| 6,015,163 A | 1/2000 | Langford et al. |
| 6,039,344 A | 3/2000 | Mehney et al. |
| 6,070,115 A | 5/2000 | Oestreicher et al. |
| 6,330,501 B1 * | 12/2001 | Breed et al. ................... 701/49 |
| 6,397,136 B1 * | 5/2002 | Breed et al. ................... 701/45 |

FOREIGN PATENT DOCUMENTS

| | | |
|---|---|---|
| DE | 197 52976 | 6/1998 |
| WO | WO 98/17508 | 4/1998 |
| WO | WO 98/58821 | 12/1998 |

* cited by examiner

VEHICLE OCCUPANT WEIGHT CLASSIFICATION SYSTEM

RELATED APPLICATIONS

This application is a divisional of Ser. No. 10/321,997 filed on Dec. 17, 2002, now U.S. Pat. No. 6,823,959 which is a continuation of Ser. No. 09/900,282 filed on Jul. 6, 2001, now U.S. Pat. No. 6,578,870 which claims priority to provisional applications 60/217,579 filed on Jul. 12, 2000, 60/217,580 filed on Jul. 12, 2000, and 60/217,582 filed on Jul. 12, 2000.

BACKGROUND OF THE INVENTION

1. Field of the Invention

This invention relates to a method and apparatus for classifying vehicle occupants utilizing multiple vehicle sensors to generate a three-dimensional profile.

2. Related Art

Most vehicles include airbags and seatbelt restraint systems that work together to protect the driver and passengers from experiencing serious injuries due to high-speed collisions. It is important to control the deployment force of the airbags based on the size of the driver or the passenger. When an adult is seated on the vehicle seat, the airbag should be deployed in a normal manner. If a small child is sitting on the seat, then the airbag should not be deployed or should be deployed at a significantly lower deployment force. One way to control the airbag deployment is to monitor the weight and position of the seat occupant. The weight information and position information can be used to classify seat occupants into various groups, e.g., adult, child, infant, and occupant close to dashboard, etc., to ultimately control the deployment force of the airbag.

There are many different systems for measuring weight and determining the position of a seat occupant. These systems use sensors placed in various locations within the vehicle to continuously monitor the position and weight of the occupants. For example, a typical vehicle may include load cells mounted within the seat to measure occupant weight and optical sensors mounted to the dashboard to determine the position of the occupant. Information from the sensors is compiled by a central processing unit and the occupant is classified. Airbag deployment is then controlled based on this classification.

Current classification systems typically use a decision tree method for assigning a class to an occupant. The decision tree method offers only a limited number of comparison tests, which can lead to classification inaccuracies. Further, the decision tree method is unable to adapt to accommodate changes within the system as the system operates over time.

Another problem with current classification systems is that classification accuracy is affected by the number and orientation of seat sensors. Each vehicle can have a different mounting requirement for seat sensors. Smaller vehicles with small seats and limited packaging space, often cannot accommodate a preferred number of sensors or a preferred sensor mounting orientation, which can result in inaccuracies. Further, each different sensor mounting configuration requires its own software, which increases system cost.

System inaccuracies are also caused by sensor shifting. Over time, sensors within the vehicle can be shifted from their original locations creating offset. Thus, when there is offset, the classification system is classifying occupants assuming that the sensors are still in their original locations while in practice the sensors are providing measurements from other locations.

Thus, it is desirable to have a method and apparatus for classifying seat occupants that can reduce inaccuracies caused by sensor shifting, variable sensor mounting configurations, and limited decision processes. The method and apparatus should also be able to adapt with system changes over time in addition to overcoming the above referenced deficiencies with prior art systems.

SUMMARY OF THE INVENTION

The subject invention includes a method and apparatus for classifying vehicle occupants utilizing multiple vehicle sensors to generate a three-dimensional profile.

The classification system utilizes sensors that are installed in various locations throughout the vehicle. The sensors transmit data to a central processing unit that generates a three-dimensional profile representative of the vehicle occupant. Fuzzy logic is used to reduce inaccuracies by providing multiple decision levels for various stages of the classification. The central processing unit also reduces inaccuracies caused by offset by utilizing a measuring function to determine the amount of offset and to generate an appropriate correction factor to provide a more accurate three-dimensional profile. Electrically erasable programmable read-only memory (EE-PROM) is used to reduce inaccuracies associated with seat occupant weight sensors that have mounting configurations that vary depending upon the vehicle.

The subject invention provides an improved method and apparatus that more accurately classifies vehicle occupants. The classification information is used for vehicle restraint system control. These and other features of the present invention can be best understood from the following specification and drawings, the following of which is a brief description.

DETAILED DESCRIPTION OF AN EXEMPLARY EMBODIMENT

Figure 1:
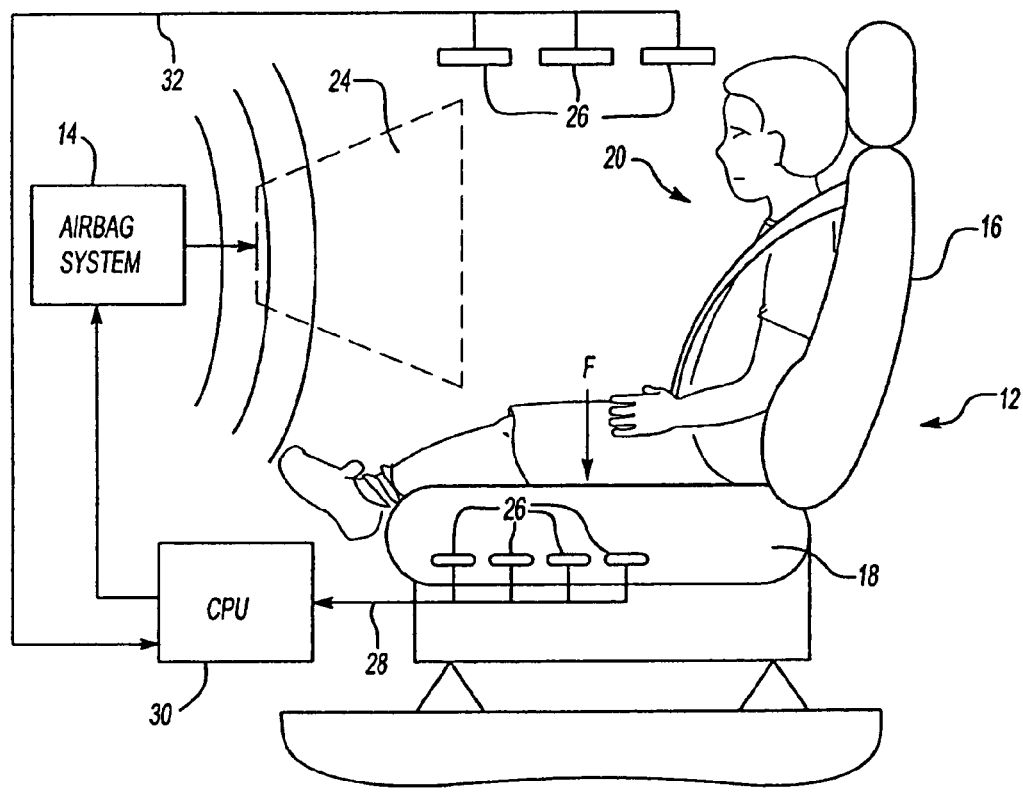
FIG. 1 is a schematic representation of a vehicle seat and airbag system incorporating the subject invention.

A vehicle includes a vehicle seat assembly, shown generally at 12 in FIG. 1, and a restraint system including an airbag system 14. The seat assembly 12 is preferably a passenger seat and includes a seat back 16 and a seat bottom 18. A vehicle occupant 20 exerts a force F against the seat bottom 18. The vehicle occupant 20 can be an adult, child, or infant in a car seat.

The airbag system 14 deploys an airbag 24 under certain collision conditions. The deployment force for the airbag 24, shown as deployed in dashed lines in FIG. 1, varies depending upon the type of occupant that is seated on the seat 12. For an adult, the airbag 24 is deployed in a normal manner. If there is child or an infant in a car seat secured to the vehicle seat 12 then the airbag 24 should not be deployed or should be deployed at a significantly lower deployment force. Thus, it is important to be able to classify seat occupants in order to control the various restraint systems.

One way to classify occupants is to monitor and measure the weight force F exerted on the seat bottom 18 and to monitor and determine the position of the occupant within the vehicle. Multiple sensors 26 are mounted throughout the vehicle to determine seat occupant weight and position. Some sensors 26 are preferably mounted within the seat bottom 18 for generating occupant weight signals 28, each representing portions of the occupant weight exerted against each respective seat sensor 26. The signals 28 are transmitted to a central processing unit (CPU) 30 and the combined output from the sensors 26 is used to determine seat occupant weight. This process will be discussed in greater detail below.

Typically, seats used in different vehicles require different sensor mounting configurations. If differing designs of the seat sensor unit are used, the sensor arrangement can be divided into zones. A reference cell can lie in each zone that can be used for compensation of the sensor cells. Maximum flexibility and minimum electrically erasable programmable read-only memory (EEPROM) requirements will be realized in the assignment of the reference cells and the zones of the sensor arrangement to a virtual arrangement of sensor cells. By the use of EEPROM programmable zone coding, each individual zone can be unambiguously assigned to the virtual sensor arrangement. For example, only four (4) bytes of EEPROM will be necessary for four (4) zones with this coding to achieve an unambiguous, yet flexible, assignment. By using this design, it is possible to achieve high system flexibility with only minimum memory requirements. This will be discussed in further detail below.

Other sensors 26 are mounted within the vehicle to determine occupant position. These sensors generate position signals 32 that are transmitted to the CPU 30. The signals 28, 32 are combined to generate a three-dimensional profile that is used to classify the occupant.

The sensors 26 mounted within the vehicle can be any known sensors in the art including contact and/or non-contact sensors. For example, the sensors mounted within the seat are preferably load cells that utilize strain gages. The position sensors can be optical sensors or other similar sensors. The CPU 30 is a standard microprocessing unit the operation of which is well known and will not be discussed in detail. A single CPU 30 can be used to generate the three-dimensional profiles or multiple CPUs 30 working together can be used.

Once seat occupant weight and position is determined, the occupant is classified into one of any of the various predetermined occupant classes, e.g., adult, child, infant, close to airbag deployment area, far from airbag deployment area, etc. Vehicle restraint systems are then controlled based on the classification assigned to the occupant. For example, if the classification indicates that an adult is in the seat 12 then the airbag 24 is deployed in a normal manner. If the classification indicates that a child or infant is the seat occupant then the airbag 24 will not be deployed or will be deployed at a significantly lower deployment force.

Fuzzy logic is used to reduce inaccuracies that result from classification of persons and objects by using one or several measurements from a three-dimensional input profile. Various features will be determined from the input profile, which will have to be combined in a suitable comparison logic unit in order to achieve correct classification of the person. Previously, decision trees were used to compare features. The disadvantage with this method is that it provides only a limited number of comparison tests and cannot be used adaptively.

Instead, the subject invention uses fuzzy logic to provide multiple links that can lead to more precise classifications. Fuzzy logic is a type of logic that recognizes more than simple true and false values. With fuzzy logic, propositions can be represented with degrees of truthfulness and falsehood. Using fuzzy logic results in higher success rates for classifications and results are achieved with significantly less effort and computing time because of the use of a flexible, adaptive fuzzy set.

Classification inaccuracies can also be caused by system offset. Certain calculated features can be reproduced inadequately because of the actual position of the three-dimensional input values with regard to the sensor arrangement, i.e. the actual position of the input values is different than the original sensor arrangement thereby creating offset. However, since this position offset in the system is known, with the help of additional measurements, these features can be affected adaptively in order to improve classification accuracy. A measuring function is used to evaluate the position offset of the input values from the sensor arrangement and at the same time prepares a correction factor in order to adjust the features that have not been calculated adequately. Because an adaptive solution is used, an effect can be made selectively on the respective conditions of the three-dimensional input value, whether there is position offset or not. It is possible to have a gradual effect on the features in contrast to fixed threshold value switching of prior systems. The inverse of this modification can also be controlled using this mechanism. This will be discussed in further detail below.

Figure 2:
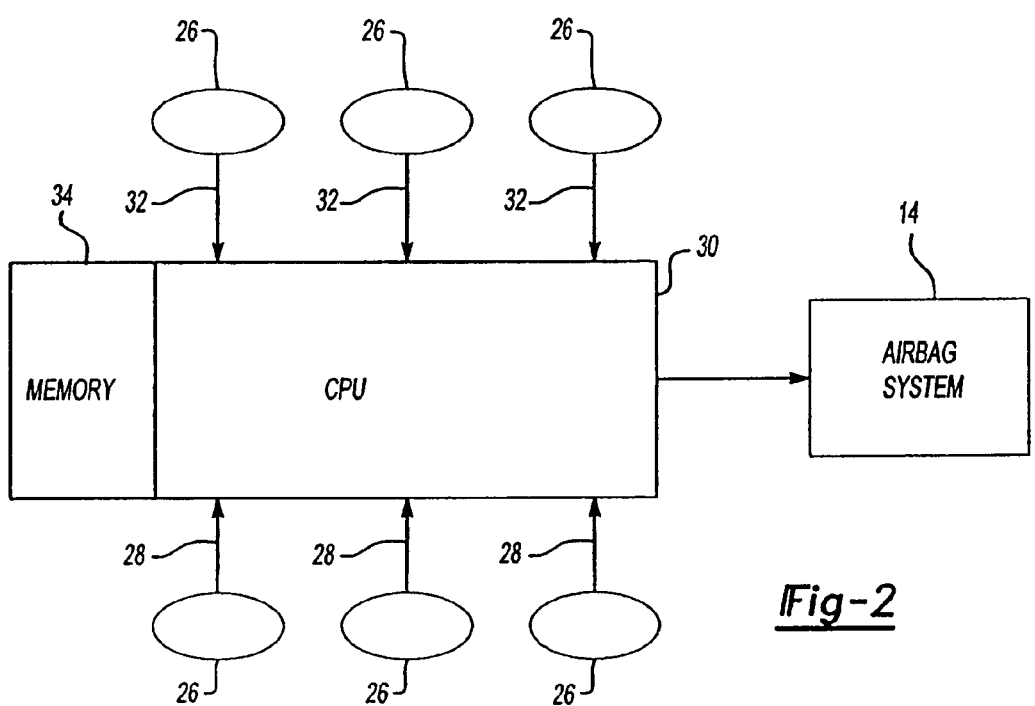
FIG. 2 is a schematic representation of the subject system.

As discussed above, and as schematically shown in FIG. 2, the system for classifying vehicle occupants includes multiple sensors 26 mounted within a vehicle to generate a plurality of occupant measurement signals 28, 32, which are transmitted to a CPU 30 which generates a three-dimensional profile for occupant classification by using fuzzy logic. The CPU 30 includes a memory unit 34 for storing an information factor for comparison to the three-dimensional profile. The memory unit 34 can be part of the CPU 30 or can be a separate unit associated with the CPU 30 depending upon the application. The CPU 30 generates a correction factor if the three-dimensional profile varies from the information factor by a pre-determined amount. If correction is required, the CPU 30 generates a corrected three-dimensional profile that is used to classify the occupant. if correction is not required, then the CPU 30 uses the original information. The airbag system 14 controls airbag deployment based on this classification.

The information factor that is used for comparison to the three-dimensional profile is based on various data inputs. One part of the information factor includes a predefined or original sensor arrangement with known sensor positions and calibrations. The three-dimensional profile generated by the sensor measurements represents actual sensor position input values. The CPU 30 compares the actual sensor position input values to the predefined sensor arrangement to determine an offset. The measuring function is used to determine the amount of offset and to generate the correction factor to adjust the actual sensor position input values for the corrected three-dimensional profile.

Figure 3:
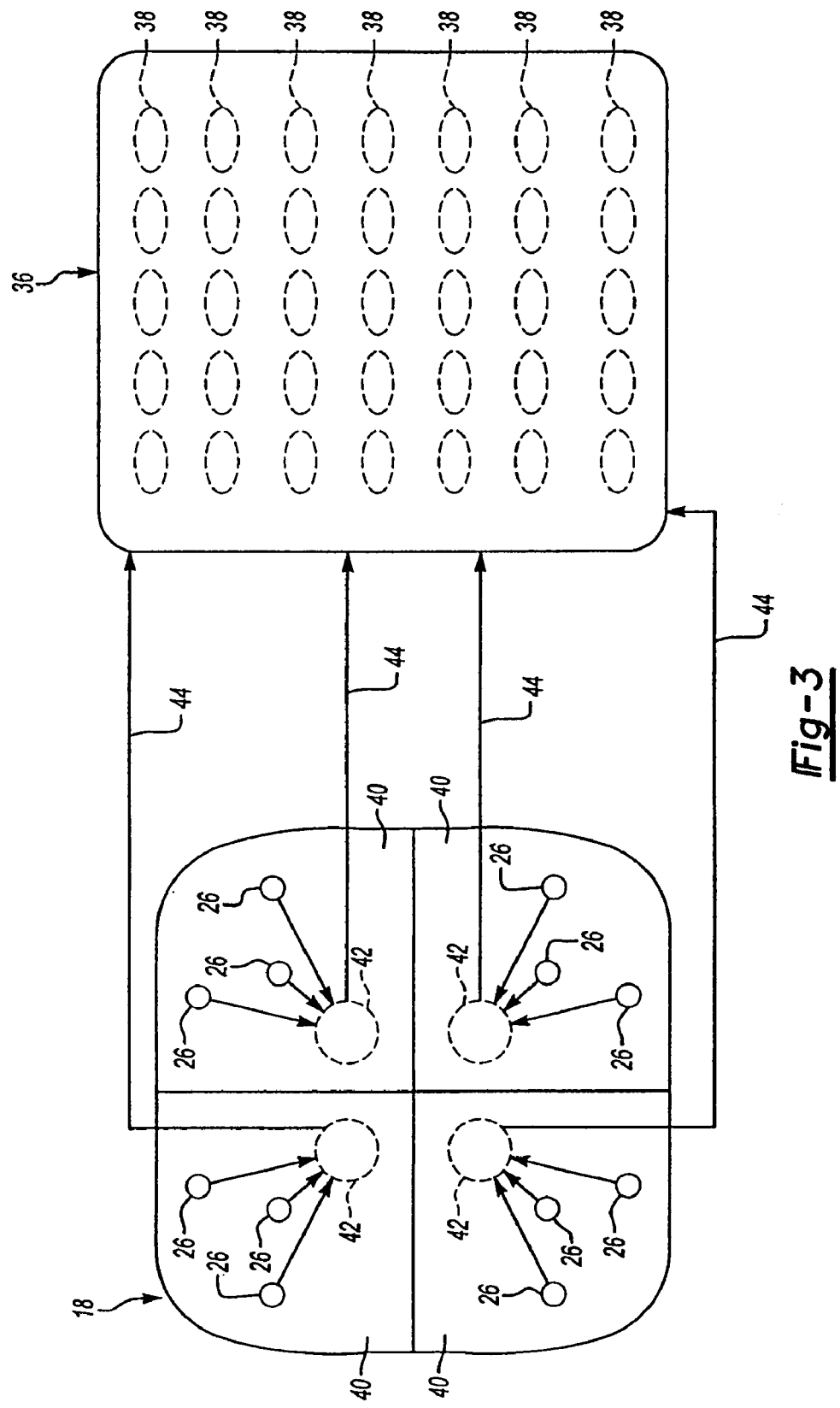
FIG. 3 is a schematic representation of a seat sensor configuration incorporating the subject invention.

Another part of the information factor is seat sensor mounting configurations. As discussed above, different seats have a different number of seat sensors 26 mounted in any of various mounting configurations. For example, as shown in FIG. 3, a certain number of seat sensors 26 are mounted within a seat bottom 18. The information factor includes a virtual sensor matrix, shown generally at 36 that defines a predetermined maximum or ideal number of virtual weight sensor positions 38. Typically this maximum or ideal number of virtual weight sensor positions 38 is greater than the actual number of sensors 26 mounted within the seat bottom 18.

To permit the use of common system hardware and software for various different seat sensor mounting configurations, the CPU 30 and EEPROM 34 divide the seat sensors 26 into a plurality of zones 40. Any number of zones 40 can be used and four (4) zones are shown in the preferred embodiment of FIG. 3. Each zone 40 covers a subset of the virtual weight sensor positions 38. A reference cell 42 is assigned to each zone 40 for compiling the weight signals 28 from that zone 40 to generate weight zone signals 44 representing data for the respective subset of the virtual weight sensor positions 38. The CPU 30 and EEPROM 34 map each weight zone signal 44 into the virtual sensor matrix 36 such that all of the virtual weight sensor positions 38 are filled. The CPU 30 then determines seat occupant weight based on the virtual sensor matrix 36 to generate the corrected three-dimensional profile.

The method for classifying vehicle occupants is discussed in detail below. First a plurality of sensors 26 are mounted within the vehicle which generate a plurality of occupant measurement signals 28, 32 in response to an occupant or object being present within the vehicle. The three-dimensional profile is determined based on these occupant measurement signals and is compared to an information factor. A correction factor is applied if the three-dimensional profile varies from the information factor by a pre-determined amount to generate a corrected three-dimensional profile. The information factor is a compilation of various features and the determination of whether or not to apply a correction factor is dependent upon the specific feature in question. The occupant is then classified based on either the original or corrected three-dimensional profile.

In the preferred embodiment, fuzzy logic is used to classify the occupant. Specifically, fuzzy logic is used to generate the three-dimensional profile, the corrected three-dimensional profile, and occupant classification.

Also in the preferred embodiment, a plurality of weight sensors 26 are installed in the vehicle seat to determine occupant weight. The sensors 26 generate weight signals 28 in response to a weight force F being applied against the seat bottom 18. The information factor includes the virtual sensor matrix 36, which defines a predetermined number of virtual weight sensor positions 38. The weight signals 28 are mapped into the virtual weight sensor positions 38 to determine seat occupant weight as part of the three-dimensional profile. The correction factor is applied if the number of weight sensors 26 is less than the predetermined number of virtual weight sensor positions 38. Applying the correction factor includes dividing the weight sensors 26 into a plurality of zones 40 with each zone 40 defined as covering a subset of the virtual weight sensor positions 38. Each zone 40 is assigned a reference cell 42 for compiling the weight signals 28 from that zone 40 to form a weight zone signal 44 representing data for the subset of the virtual weight sensor positions 38. Each weight zone signal 44 is mapped into the virtual sensor matrix 36 such that all virtual weight sensor positions 38 are filled and seat occupant weight is determined from the virtual sensor matrix 36 for use in generating the corrected three-dimensional profile. The subset of virtual weight sensor positions 38 for each zone 40 includes a greater number of sensor positions than the number of sensors 26 assigned to each zone 40. The CPU 30 and BEPROM 34 work in conjunction to generate the virtual matrix 36, assign zones 40, and map signals into the matrix 36.

Also in the preferred embodiment the three-dimensional profile is based on an actual position of three-dimensional input values while the information factor includes a defined sensor arrangement. The actual position is compared to the defined sensor arrangement to determine if there is offset. A measuring function is used to evaluate the offset and to generate the correction factor to adjust the input values to generate the corrected three-dimensional profile. This allows the same system software to be used for all offset values.

The subject invention provides a method and apparatus for classifying seat occupants that reduces inaccuracies caused by sensor shifting, variable sensor mounting configurations, and limited decision processes. The subject method and apparatus is also able to adapt with system changes over time.

Although a preferred embodiment of this invention has been disclosed, it should be understood that a worker of ordinary skill in the art would recognize many modifications come within the scope of this invention. For that reason, the following claims should be studied to determine the true scope and content of this invention.

We claim:

1. A method for determining vehicle occupant characteristics to classify vehicle occupants comprising the steps of:
   (a) establishing a first position for an occupant sensor or a seat occupant;
   (b) generating a plurality of occupant signals from the occupant sensor, generating a three-dimensional profile based on the plurality of occupant signals, and comparing the three-dimensional profile to an information factor;
   (c) determining if there is a difference between the three-dimensional profile and the information factor; and
   (d) generating a correction factor to correct for the difference if the three-dimensional profile varies from the information factor by a pre-determined amount.

2. The method according to claim 1 wherein step (a) further includes defining an initial occupant position by positioning an occupant on a seat, generating a corresponding initial occupant input value to generate an initial three-dimensional profile, and classifying the occupant based on the initial three-dimensional profile.

3. The method according to claim 2 including monitoring occupant position with the occupant sensor, identifying new sensor output values from the occupant sensor, generating a new three-dimensional profile based on the new sensor output values, and comparing the information factor to the new three-dimensional profile and applying the correction factor to generate a corrected three-dimensional profile to adjust occupant classification when the new-three-dimensional profile varies from the information factor by the pre-determined amount.

4. The method according to claim 3 wherein determining the difference as set forth in step (c) further includes determining the difference between the information factor and any new three-dimensional profiles generated in response to sensor output changes from the occupant sensor.

5. The method according to claim 4 including the step of installing a plurality of occupant sensors within a vehicle, generating the plurality of occupant signals with the plurality of occupant sensors to provide a plurality of occupant characteristic values defining one occupant position, generating new occupant characteristic values in response to new output data from the plurality of occupant sensors to define a new occupant position, generating the correction factor for each three-dimensional profile if the three-dimensional profile varies from the information factor by the pre-determined amount to define the corrected three-dimensional profile.

6. The method according to claim 1 wherein step (a) further includes determining a plurality of occupant characteristics based on the plurality of occupant signals to define an initial occupant position; wherein step (b) further includes continuing to monitor the plurality of occupant signals to identify new sensor values, and generating a new three-dimensional profile for each new sensor value; wherein step (c) further includes determining the difference based on a comparison of each three-dimensional profile to the information factor; and wherein step (d) further includes applying the correction factor to generate a corrected three-dimensional occupant profile when each three-dimensional profile varies from the information factor by the pre-determined amount, and classifying the seat occupant based on the corrected three-dimensional occupant profile.

7. The method according to claim 1 including the steps of mounting a plurality of occupant sensors within a vehicle to generate the plurality of occupant signals, generating at least one initial occupant sensor value with the first position, being defined as an initial sensor position arrangement based on the occupant sensor value, generating the information factor based on the initial occupant sensor value, generating the three-dimensional occupant profile based on the plurality of occupant signals, comparing the information factor to the three-dimensional occupant profile, identifying variance when a current occupant sensor value varies from the initial occupant sensor value, defining the second position as a shifted sensor position arrangement once variance is identified, determining an amount of variance between the initial and shifted sensor position arrangements, applying the correction factor to the three-dimensional occupant profile to generate a corrected three-dimensional occupant profile, and classifying the seat occupant based on the corrected three-dimensional occupant profile.

8. A method for determining vehicle occupant characteristics to classify vehicle occupants comprising the steps of:
   (a) establishing at least one initial occupant sensor value;
   (b) comparing a subsequently measured occupant sensor value to the initial occupant sensor value to define a current occupant sensor value;
   (c) identifying offset when the current occupant sensor value vanes from the initial occupant sensor value;
   (d) automatically adjusting subsequently measured occupant sensor values to correct for the offset.

9. The method according to claim 8 further including the step of determining a degree of sensor position variance in response to detection of offset and generating a correction factor to correct subsequently measured occupant sensor values based on the degree of sensor position variance.

10. The method according to claim 9 including the step of installing a plurality of occupant sensors within a vehicle to define an initial occupant sensor position and wherein over a period of time at least one of the occupant sensors moves from an initial installed position to a shifted occupant sensor position with the offset being created by the shifted occupant sensor position.

11. The method according to claim 10 including the step of measuring a plurality of occupant characteristics with the occupant sensors to generate a plurality of occupant sensor values, and automatically adjusting the occupant sensor values by the correction factor.

12. The method according to claim 8 including the steps of generating an information factor based on the initial occupant sensor value, generating a three-dimensional occupant profile based on a plurality of occupant measurement signals, comparing the information factor to the three-dimensional occupant profile, generating a correction factor when the current occupant sensor value varies from the initial occupant sensor value, automatically applying the correction factor to the three-dimensional occupant profile to generate a corrected three-dimensional occupant profile, and classifying vehicle occupants based on the corrected three-dimensional occupant profile.

13. A system for determining vehicle occupant characteristics to classify vehicle occupants including:

a plurality of occupant sensors mounted within a vehicle to generate a plurality of occupant characteristic values in response to an occupant being present within the vehicle; and a central processing unit for receiving said occupant characteristic values, establishing at least one initial occupant sensor value, comparing a subsequently measured occupant sensor value to said initial occupant sensor value to define a current occupant sensor value, identifying offset when said current occupant sensor value varies from said initial occupant sensor value, and automatically adjusting subsequently measured occupant sensor values to correct for the offset.

14. The system according to claim 13 wherein said central processing unit determines a degree of sensor or occupant position variance in response to detection of system offset and generates a correction factor to correct the at least one initial occupant characteristic value based on the degree of sensor or occupant position variance.

15. The system according to claim 14 wherein the plurality of occupant sensors are installed in an initial occupant sensor position and over a period of time at least one of the occupant sensors moves from an initial installed position to a shifted occupant sensor position with the system offset being created by the shifted occupant sensor position.

16. The system according to claim 14 wherein all occupant characteristic values are automatically adjusted by the correction factor.

17. The system according to claim 13 wherein said central processing unit generates an information factor based on said initial occupant sensor value, generates a three-dimensional occupant profile based on a plurality of occupant measurement signals, compares the information factor to the three-dimensional occupant profile, and generates a correction factor when said current occupant sensor value varies from said initial occupant sensor value, said central processing unit automatically applying said correction factor to said three-dimensional occupant profile to generate a corrected three-dimensional occupant profile and classifying vehicle occupants based on the corrected three-dimensional occupant profile.

18. A system for classifying vehicle occupants including:
a plurality of sensors mounted within a vehicle for monitoring and determining a position of an occupant within the vehicle wherein said plurality of sensors generates a first plurality of occupant measurement signals in response to the occupant being present within the vehicle;

a central processing unit for receiving said first plurality of occupant measurement signals and generating a first three-dimensional profile based on said first plurality of occupant measurement signals, a memory unit for storing an information factor for comparison to said first three-dimensional profile to determine a difference between said first three-dimensional profile and said information factor wherein said central processing unit generates a correction factor if said first three-dimensional profile varies from said information factor by a pre-determined amount resulting in generation of a corrected three-dimensional profile and wherein said central processing unit classifies the occupant based on either the first or corrected three-dimensional profile.

19. The system according to claim 18, wherein said plurality of sensors generates a second plurality of occupant measurement signals in response to the occupant changing position within the vehicle and generates a subsequent plurality of occupant measurement signals each time the occupant changes position; said central processing unit receiving said second plurality of occupant measurement signals and said subsequent plurality of occupant measurement signals and generating a second three-dimensional profile based on said second plurality of occupant measurement signals and generating at least one subsequent three-dimensional profile based on said subsequent plurality of occupant measurement signals; and wherein said memory unit compares said second three-dimensional profile and any of said subsequent three-dimensional profiles to said information factor to determine a difference between said second three-dimensional profile and said information factor and a difference between any of said subsequent three-dimensional profiles and said information factor wherein said central processing unit generates a correction factor if said second three-dimensional profile or any subsequent three-dimensional profile varies from said information factor by the pre-determined amount resulting in generation of the corrected three-dimensional profile.

20. The system according to claim 19 wherein said plurality of sensors includes a plurality of weight sensors and a plurality of occupant sensors.

* * * * *